United States Patent
Loudot (10) Patent No.: US 7,733,052 B2
(45) Date of Patent: *Jun. 8, 2010

(54) METHOD FOR CONTROLLING A HEAT ENGINE VEHICLE DRIVING ASSEMBLY

(75) Inventor: Serge Loudot, Villiers le Bacle (FR)

(73) Assignee: Renault s.a.s., Boulogne-Billancourt (FR)

( * ) Notice: Subject to any disclaimer, the term of this patent is extended or adjusted under 35 U.S.C. 154(b) by 143 days.

This patent is subject to a terminal disclaimer.

(21) Appl. No.: 11/720,492

(22) PCT Filed: Nov. 24, 2005

(86) PCT No.: PCT/FR2005/050984

§ 371 (c)(1),
(2), (4) Date: May 30, 2007

(87) PCT Pub. No.: WO2006/059028

PCT Pub. Date: Jun. 8, 2006

(65) Prior Publication Data

US 2008/0157706 A1 Jul. 3, 2008

(30) Foreign Application Priority Data

Nov. 30, 2004 (FR) .................................. 04 12671

(51) Int. Cl.
*H02P 23/00* (2006.01)
(52) U.S. Cl. ........................................ 318/701; 701/22
(58) Field of Classification Search .................. 318/700, 318/701; 701/22
See application file for complete search history.

(56) References Cited

U.S. PATENT DOCUMENTS

| | | | | |
|---|---|---|---|---|
| 3,936,726 A | * | 2/1976 | Kelley, Jr. | 323/237 |
| 4,707,650 A | | 11/1987 | Bose | |
| 5,469,039 A | * | 11/1995 | Stephenson et al. | 318/701 |
| 5,545,964 A | * | 8/1996 | Stephenson et al. | 318/701 |
| 5,563,488 A | * | 10/1996 | Stephenson et al. | 318/701 |
| 5,789,893 A | * | 8/1998 | Watkins | 318/701 |
| 5,838,133 A | * | 11/1998 | McCann | 318/701 |

(Continued)

FOREIGN PATENT DOCUMENTS

EP 0 534 761 3/1993

OTHER PUBLICATIONS

U.S. Appl. No. 11/720,482, filed May 30, 2007, Loudot, et al.

(Continued)

*Primary Examiner*—Mark Hellner
*Assistant Examiner*—Helal A Algahaim
(74) *Attorney, Agent, or Firm*—Oblon, Spivak, McClelland, Maier & Neustadt, L.L.P.

(57) ABSTRACT

A control method for a vehicle drive assembly includes applying a conduction angle set point value to a variable reluctance machine. The method also includes regulating the conduction angle set point value by comparing a table set point torque from an angle table and a torque estimation value to determine a control measurement of torque delivered by the drive assembly. The control measurement of torque is corrected to an additional conduction angle which is added to a set point angle from the angle table to determine the regulated conduction angle set point value.

20 Claims, 6 Drawing Sheets

U.S. PATENT DOCUMENTS

| | | | | |
|---|---|---|---|---|
| 5,841,262 A | * | 11/1998 | Tang | 318/701 |
| 6,075,332 A | * | 6/2000 | McCann | 318/432 |
| 6,166,511 A | * | 12/2000 | Sugiyama et al. | 318/701 |
| 6,819,008 B2 | * | 11/2004 | Kaplan et al. | 290/44 |
| 6,898,509 B2 | * | 5/2005 | Nicolaou et al. | 701/110 |
| 6,898,510 B2 | * | 5/2005 | Roth et al. | 701/114 |
| 2002/0101221 A1 | * | 8/2002 | Stefanovic et al. | 322/24 |
| 2002/0113615 A1 | * | 8/2002 | Atarashi | 324/772 |
| 2003/0140895 A1 | * | 7/2003 | Nicolaou et al. | 123/406.21 |
| 2003/0140896 A1 | * | 7/2003 | Roth et al. | 123/406.23 |
| 2004/0178774 A1 | * | 9/2004 | Randall et al. | 322/23 |
| 2007/0278983 A1 | * | 12/2007 | Clothier et al. | 318/701 |

OTHER PUBLICATIONS

Robert B. Inderka, et al., "DITC-Direct Instantaneous Torque Control of Switched Reluctance Drives", Conference Record of the 2002 IEEE Industry Applications Conference, 37$^{th}$ IAS Annual Meeting, vol. 1 of 4., Conf. 37. XP 010610094, pp. 1605-1609, 2002.

J. M. Stephenson, et al., "The Characteristics, Design and Applications of Switched Reluctance Motors and Drives", PCIM Europe Proceedings of the International Intelligent Motion Conference, vol. 5, XP 002956735, pp. 1-68, 1993.

* cited by examiner

FIG.3  Current in a motor phase and voltage applied to the latter according to the electrical angle at low speed FIG.4  Current in a motor phase and voltage applied to the latter according to the electrical angle at high speed FIG.5  Effect of a variation of the air gap on the energy cycle.

FIG.6  Energy transmitted in an electrical period at high speed

FIG.7  Energy transmitted in the magnetization phase

FIG.8  Energy transmitted on demagnetization

FIG.9  Theoretical diagram of direct torque regulation

FIG.10  Torque regulation calculation sequence examples

FIG.11  Trend of the energy cycle over several periods with regulation of Θp.

FIG.12  Estimation of phase flux

METHOD FOR CONTROLLING A HEAT ENGINE VEHICLE DRIVING ASSEMBLY

BACKGROUND OF THE INVENTION

I. Field of the Invention

The invention relates to the drive assemblies of vehicles comprising an internal combustion engine, and control methods for such assemblies.

II. Description of Related Art

Figure 1:
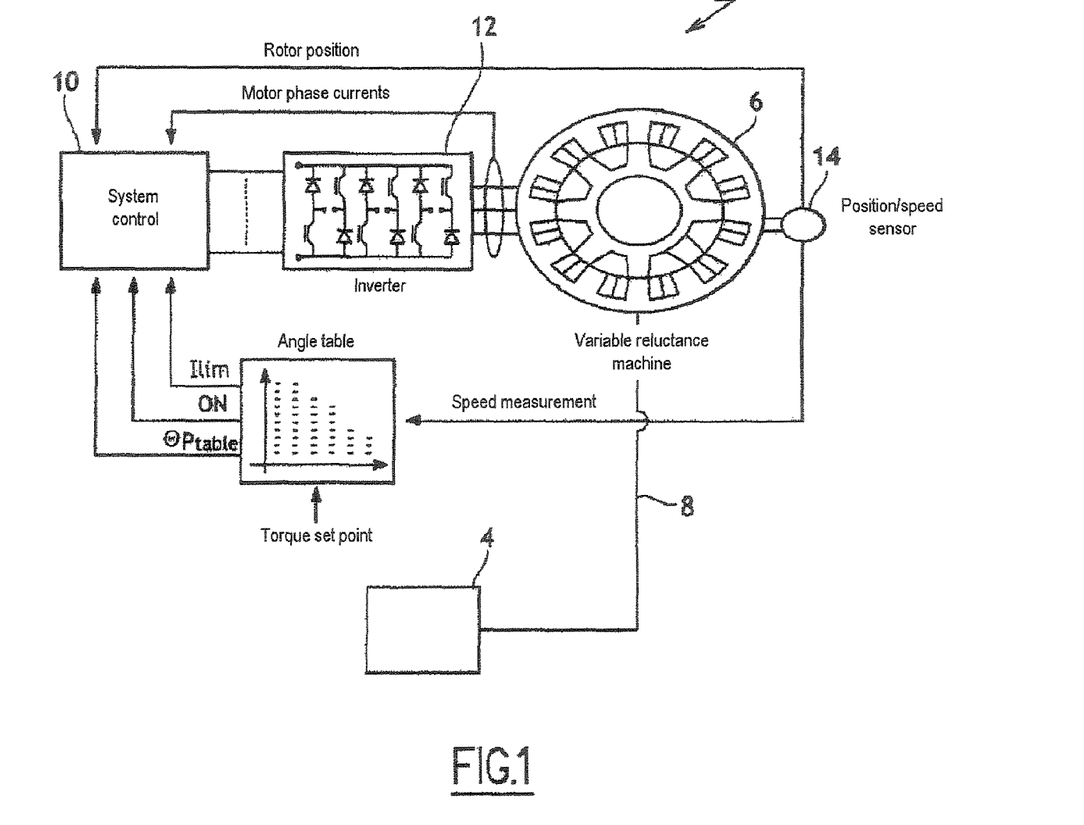
FIG. 1 represents a conventional exemplary embodiment of a drive assembly for a vehicle.

FIG. 1 represents one conventional exemplary embodiment of such an assembly. The assembly 2 forms a motor vehicle drive assembly. In a manner known per se, this assembly comprises an internal combustion engine 4, such as a petrol motor or a diesel motor. It comprises an alternator-starter formed by a variable reluctance machine 6 of a type known per se. This machine 6 is mechanically linked to the engine 4 to provide the latter with a torque, particularly in order to start it when it is stopped. This mechanical link of a type known per se carries the reference 8 in FIG. 1. The assembly comprises a control unit 10 comprising conventional computer means enabling it to control the various units of the assembly as will be seen below. The assembly 2 also comprises an inverter 12 by means of which the control unit 10 drives the operation of the machine 6.

The assembly 2 also comprises a position sensor and/or a speed sensor 14 enabling the unit 10 to know a measurement of the speed of the machine 6 at each instant.

Figure 2:
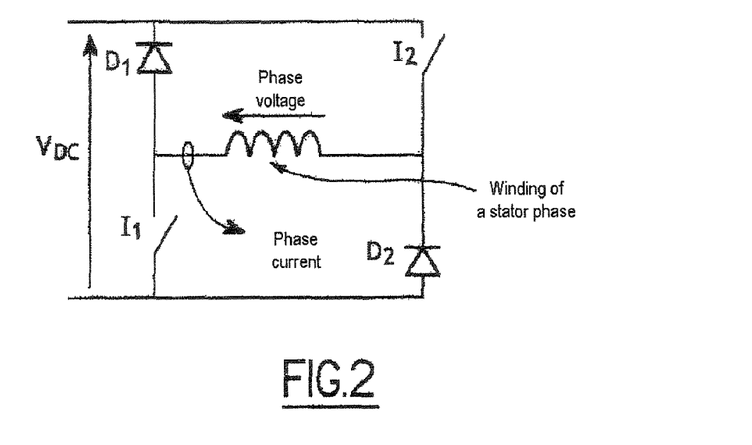
FIG. 2 represents a conventional inverter topology for controlling a motor phase.

FIG. 2 represents a conventional inverter topology for controlling the motor phase. In this FIG. 2, $V_{DC}$ represents the DC voltage powering the inverter, $I_1$ and $I_2$ two electric switches that can be switched open and closed and $D_1$ and $D_2$ are two diodes.

A control method for such a drive assembly installed on a vehicle (comprising, as has been seen, a reluctance machine associated with an inverter) is normally used to control the torque delivered by this drive assembly.

BRIEF SUMMARY OF THE INVENTION

However, in the context of large-scale industrial production, it is essential to guarantee the lowest possible variability of the torque supplied by two different assemblies, all other things being equal (control, power supply voltage, etc.).

Now the torque delivered by a switched reluctance machine depends strongly on the geometric dispersions of the machine, the magnetic dispersions of the plates, or even the electrical dispersions of the wires.

Figure 3:
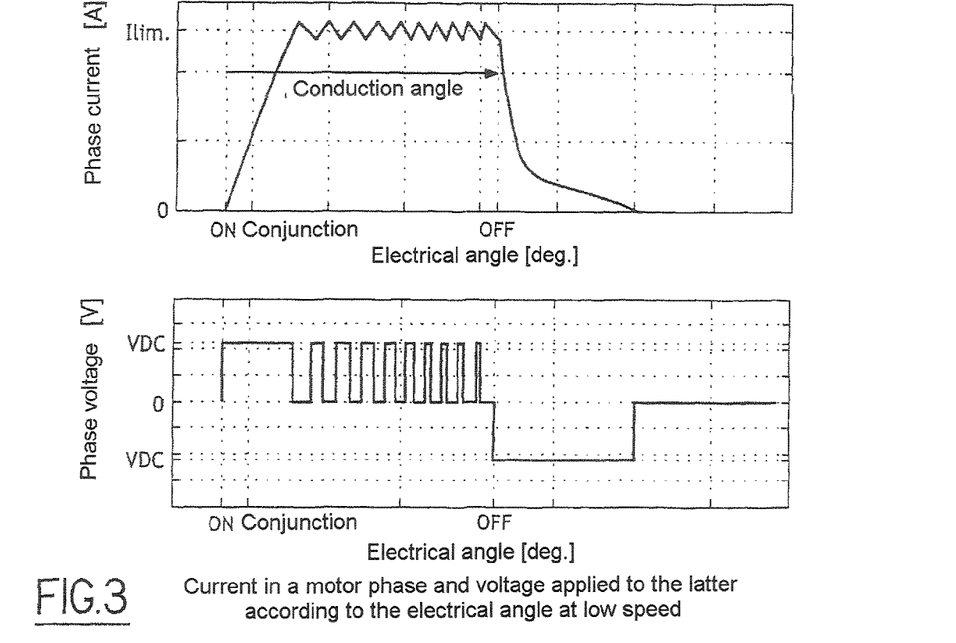
FIG. 3 illustrates the shape of the phase currents and voltages as represented in FIG. 2, at low speed, according to the electrical angle of the rotor.
Figure 4:
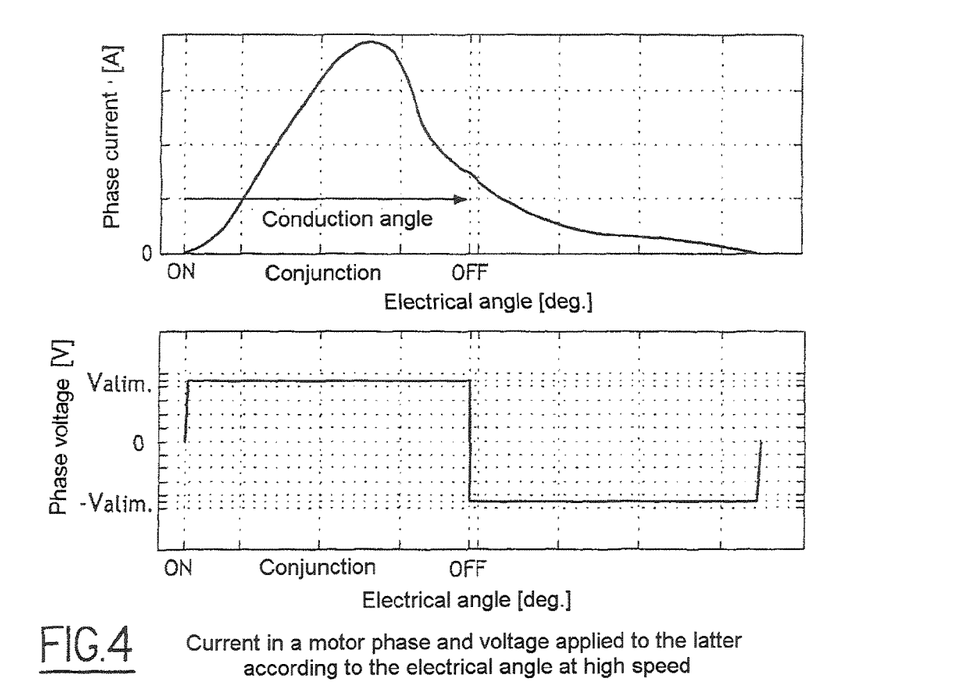
FIG. 4 illustrates the shape of the phase currents and voltages as represented in FIG. 2, at high speed, according to the electrical angle of the rotor.

FIGS. 3 and 4 illustrate the shape of the phase currents and voltages as represented in FIG. 2, respectively at low speed and at high speed, according to the electrical angle of the rotor (this angle being zero when the tooth of the rotor is in conjunction with the tooth of the stator).

It is known that a variable reluctance machine such as the machine 6 in FIG. 1 is essentially controlled by three variables:
  the start of magnetization ON and end of magnetization OFF angles;
  and, at low speeds, the peak phase current which is regulated ($I_{lim}$).
The phase of the machine is magnetized in the time interval formed by the conduction angle $\Theta p$=OFF-ON.

In order to control the variable reluctance machine, the control parameters (ON, $\Theta p$, $I_{lim}$) at low speed and (ON, $\Theta p$) at high speed are used as input parameters for the control unit 10; these parameters being optimized for each torque-speed operating point.

As illustrated in FIG. 1, and in a manner known per se, the machine 6 is controlled by the control unit 10 by means of control laws taken from tables that give the ignition (ON), conduction ($\Theta p_{table}$) and current ($I_{lim}$) angles according to the speed of the alternator obtained from the sensor 14. These quantities are also determined according to the torque to be delivered by the link 8 to the engine 4. If necessary, it is also possible to take account of the DC power supply voltage $V_{DC}$ of the inverter if the latter is likely to vary, and other parameters such as the temperature of the windings, for example.

In each electrical period, a pointer is defined according to these external parameters (speed, power supply voltage, temperature of the windings, etc.) and the torque set point. This pointer then addresses the tables which give (possibly after extrapolation) the control parameters (ON, $\Theta p$, $I_{lim}$) at low speed and (ON, $\Theta p$) at high speed.

However, this conventional open loop mode control law, according to which the control instructions applied depend only on the position, the speed, the torque set point and the current (only taken into account at low speed when it is set to $I_{lim}$), is unsatisfactory: the torque actually delivered remains totally dependent on the dispersions (mechanical, magnetic, electrical, etc.) of the machine.

Figure 5:
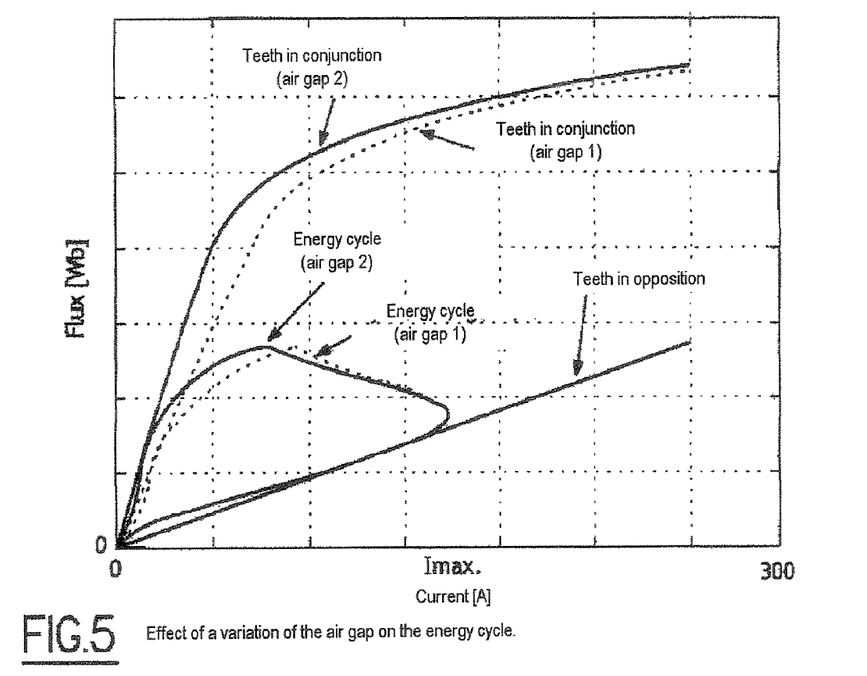
FIG. 5 represents the effects of a variation of an air gap between rotor and stator on the electromagnetic torque delivered.

Referring to FIG. 5, there are thus represented the effects of the variability of the air gap between rotor and stator on the electromagnetic torque delivered (i.e., the surface area of the energy cycle) when the conventional control is used.

It should be noted that the effects of the variation of other parameters (geometric dimensions, electrical or magnetic parameters) are relatively similar.

In FIG. 5, the air gap 1 is greater than the air gap 2 which generates a difference in the saturation curves when a rotor tooth is in conjunction with a stator tooth of the phase concerned. In opposition, the effect of the variation of the air gap is negligible.

It can be seen from this FIG. 5, for one and the same control, the electrical torque delivered is different according to the air gap of the machine.

In order to improve the quality level and provide a service that is identical from one assembly to another, a first solution consists in reducing the various tolerances of the series-produced machine (particularly, the mechanical, magnetic and electrical tolerances). This solution is, however, expensive, particularly in terms of manufacturing processes and raw materials.

One aim of the invention is to propose a solution that makes it possible to compensate for the inherent dispersions of the machine when the latter is operating, without in any way increasing the cost of such a machine.

To this end, the invention proposes, according to a first aspect, a control method for a vehicle drive assembly in which a conduction angle set point value is applied to a variable reluctance machine, characterized in that said conduction angle set point value is regulated using an additional conduction angle determined according to a control measurement of the torque delivered by the drive assembly to the engine.

Certain preferred, but non-limiting aspects of this method are as follows:
  the torque control measurement is carried out by calculating the difference between the set point torque and a torque estimation value;
  the difference is processed by a corrector provided with a correction law suitable for determining the additional conduction angle intended to be applied to the alternator to regulate said conduction angle set point value and render said difference zero;

the torque control measurement is carried out using an estimation of the phase flux;

the flux is estimated by integrating the voltage applied to this phase in an electrical period according to $\Phi_{estimated} = \int(U_{phase} - R_{phase} \cdot I_{phase})dt$, where $R_{phase}$ designates the resistance of the stator winding, $U_{phase}$ the phase voltage and $I_{phase}$ the phase current;

a direct measurement of the phase voltage is carried out;

the start and end of magnetization control instructions and the phase current are used to determine the phase voltage, the latter being equal to the power supply voltage $V_{DC}$ during the magnetization time, to $-V_{DC}$ during the demagnetization time, and to zero during the freewheeling phases or when the phase current is zero;

the flux estimation is periodically updated using a measurement flux value;

the flux estimation is realigned in each electrical period, at the time of the transition to opposition, on the value $L_0 \cdot I_{phase}$ where $L_0$ is the inductance in opposition and $I_{phase}$ the current measured at the instant of the transition to opposition;

the torque is estimated, using the flux estimation, by calculating the difference between the energy transmitted in the magnetization phase and the energy returned in the demagnetization phase;

the correction law is of proportional-integral type;

there is applied to the machine, over an electrical period, a conduction angle set point value calculated from the estimation of the flux calculated in the preceding electrical period;

the conduction angle set point value is equal to the sum of the additional conduction angle and a conduction angle value supplied by an angle table addressed by the set point torque value;

said conduction angle set point value is equal to the sum of the additional conduction angle and a conduction angle value supplied by an angle table addressed by the set point torque value;

the variable reluctance machine operates in discontinuous mode or in continuous current mode, said conduction angle value supplied by the angle table being equal to 180° when operating in continuous current mode.

According to a second aspect, the invention relates to a drive assembly for motor vehicle comprising:

an internal combustion engine;
a variable reluctance machine; and
a control unit suitable for applying a conduction angle set point value to the machine, characterized in that the control unit is also suitable for regulating said conduction angle set point value using an additional conduction angle determined according to a control measurement of the torque delivered by the drive assembly.

Some preferred, but non-limiting, aspects of this drive assembly are as follows:

it comprises appropriate means for calculating an estimation of the torque and carrying out a control measurement of the torque by measuring the difference between the set point torque and said torque estimation, and means for adjusting the conduction angle set point value according to said torque control measurement;

it comprises means for calculating an estimation of the flux and means for calculating an estimation of the torque based on said flux estimation;

an angle table being addressed by the torque set point value to supply a conduction angle value, the control unit is suitable for applying to the machine a conduction angle set point value equal to the sum of the additional conduction angle and the conduction angle value supplied by the angle table.

Finally, the invention also provides for a vehicle comprising a drive assembly according to the second aspect of the invention.

Other aspects, aims and advantages of the invention will become more apparent from reading the detailed description below of preferred embodiments of the latter, given by way of nonlimiting example and described with reference to the appended drawings.

DETAILED DESCRIPTION OF THE INVENTION

The invention aims to compensate for the inherent dispersions of the machine and its component parts in order for the electromagnetic torque delivered to be affected as little as possible by these dispersions.

To this end, the invention proposes using an electro-magnetic torque observer. This observer is used more specifically to estimate the delivered torque. A regulation law is then defined which makes it possible to correct the differences between the set point torque and the estimated torque. This correction is translated by the calculation of an additional conduction angle which is used to regulate the conduction angle set point value $\Theta p$.

The estimation of the electromagnetic torque is carried out based on an estimation of the flux in a phase.

The estimation of the flux of a phase is obtained by integrating the voltage applied to this phase: $\Phi_{estimated} = \int(U_{phase} - R_{phase} \cdot I_{phase})dt$, where $R_{phase}$ designates the resistance of the stator winding, $U_{phase}$ and $I_{phase}$ respectively designate the phase voltage and current (as is indicated in FIGS. 2, 3 and 4).

The phase voltage $U_{phase}$ corresponds to the voltage of the power supply $V_{DC}$ during the magnetization time, the voltage $-V_{DC}$ during the demagnetization phase, and 0 during the freewheeling phases or when the current is zero.

In order to calculate the phase voltage $U_{phase}$, there is used either a direct measurement of the voltage of each stator winding, or even the phase current $I_{phase}$, the DC power supply voltage $V_{DC}$ and the ON and OFF control signals. In practice, the start and end of magnetization control instructions and the measurement of the phase current make it possible to know the sign of the voltage applied to the winding (positive, negative or zero), so replacing a direct measurement of the voltage of each stator winding.

The value of the phase current $I_{phase}$ is obtained, in a manner known per se, as is represented in FIG. 1, by electrical measurement at the output of the inverter 12.

Figure 12:
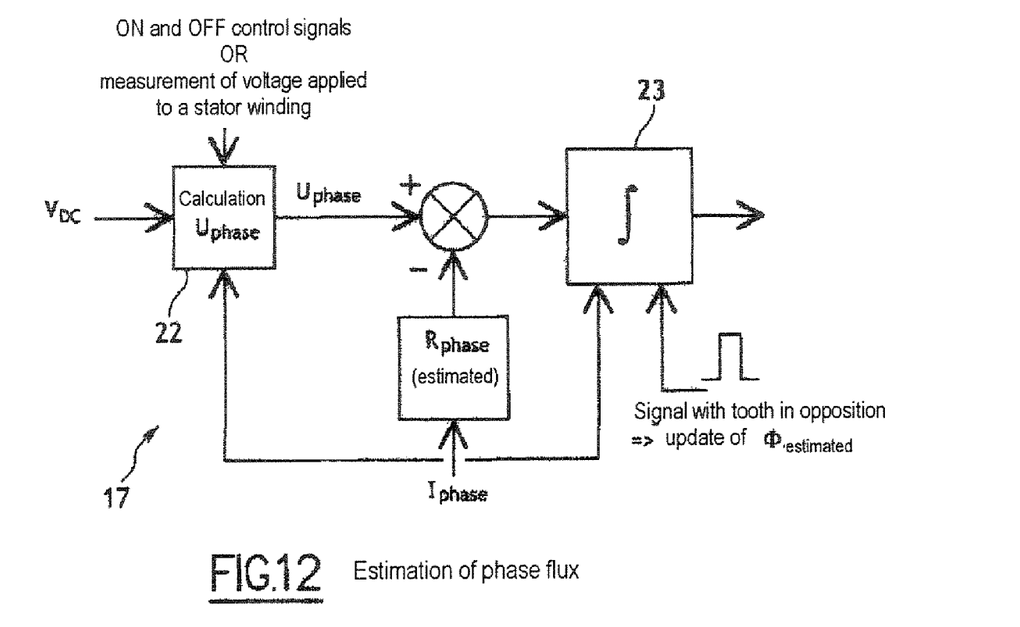
FIG. 12 represents one possible embodiment of a phase flux estimator.

FIG. 12 represents one possible embodiment of a phase flux estimator 17.

The estimator 17 thus comprises means 22 for calculating the phase voltage $U_{phase}$. These means 22 take as input parameters either a direct measurement of the voltage of each stator winding, or even the phase current $I_{phase}$, the power supply voltage $V_{DC}$ and the ON and OFF control signals.

The value of the phase current $I_{phase}$ is obtained, in a manner known per se, as is represented in FIG. 1, by electrical measurement at the output of the inverter 12.

An integrator 23 can be used to calculate the flux estimation according to the equation $\Phi estimated = \int (U_{phase} - R_{phase} \cdot I_{phase}) dt$, presented above.

In practice, however, the measurements always present errors and, above all, the resistance of the winding of a phase $R_{phase}$ is highly variable (particularly with temperature). According to one advantageous embodiment of the estimator 17, the estimated flux at the output of the integrator 23 is realigned on each electrical period.

According to one possible embodiment of the invention, this realignment is done on the transition to opposition because, at this moment, the inductance of the phase is at its most constant (therefore independent of the phase current) which minimizes the errors and simplifies the flux estimation. The estimated flux on the transition to opposition $\Phi estimated|opposition$ is therefore such that $\Phi estimated|opposition = Lo \cdot I_{phase}$, where Lo is the inductance in opposition (which can be measured with the rotor blocked in opposition, for example) and $I_{phase}$ is the phase current measured at this instant. The output of the integrator 23 is thus forced in each electrical period, on the transition to opposition, by the updating of the flux value ($Lo \cdot I_{phase}$).

The torque delivered by the machine at constant speed is proportional to the energy transmitted by a phase of the engine. It is therefore proportional to the surface area of the curve illustrated in FIG. 6 which shows the trend of the flux associated with a phase of the alternator according to the phase current, for a machine operating at high speed. The energy obtained from the electromechanical conversion is thus characterized by the surface area (or energy cycle) which is delimited by the path traveled by the phase flux and the phase current during an electrical period.

Figure 6:
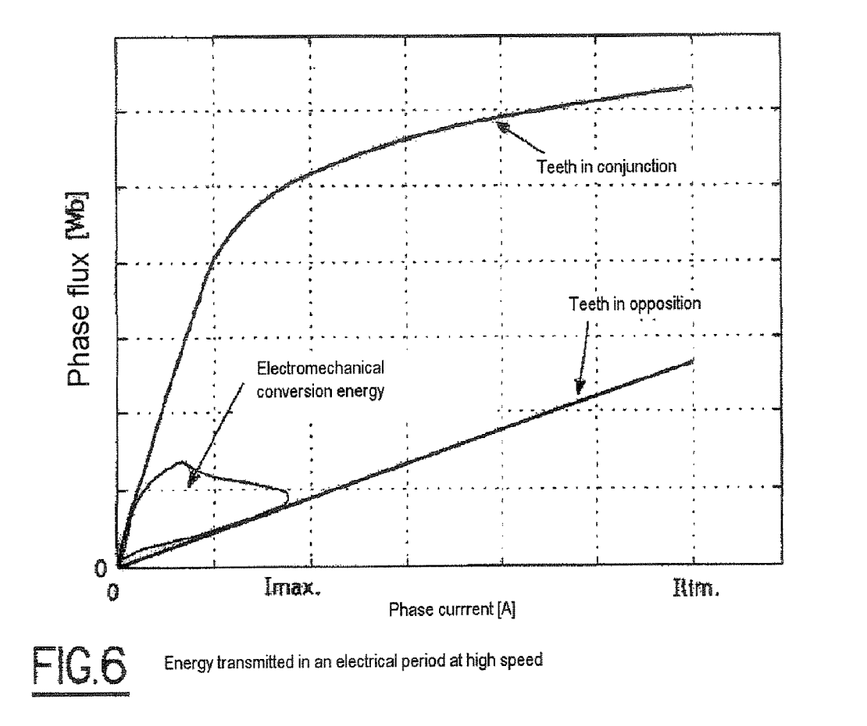
FIG. 6 represents the energy transmitted in an electrical period at high speed.

Knowing the trend of the flux during a period, it then becomes possible to estimate the electromagnetic torque transmitted by calculating the energy transmitted as graphically represented in FIG. 6.

Knowing the flux, the torque can actually be estimated by the difference between the energy Emag transmitted in the magnetization phase and the energy Edemag returned in the demagnetization phase.

The energy transmitted on magnetization is: $Emag = \int_{ON}^{OFF} I_{phase} d\phi$, where $\Phi$ is the estimated phase flux. It should be noted that the flux is strictly increasing during this phase; it reaches its maximum at the end of magnetization (OFF).

On demagnetization, the returned energy is $Edemag = \int_{OFF}^{ON} I_{phase} d\phi$. In this phase, the flux is strictly decreasing.

Algebraically, Emag and Edemag have opposite signs. The sum of these two quantities (or the difference of their absolute values) represents the converted energy and is therefore an image of the electromechanical torque of the machine.

Over an electrical period, the average electromechanical torque delivered is proportional to the surface area of the energy cycle represented by FIG. 6.

Knowing the flux at each instant from flux estimator 17 described previously, and having a measurement of the phase current and an image of the voltage applied to the winding (which, as has already been mentioned, can be measured directly or estimated via the control and the value of the current), it is possible to have an image of the electromechanical torque by direct calculation of the energy represented by this surface area.

This energy can thus be calculated in two phases.

Figure 7:
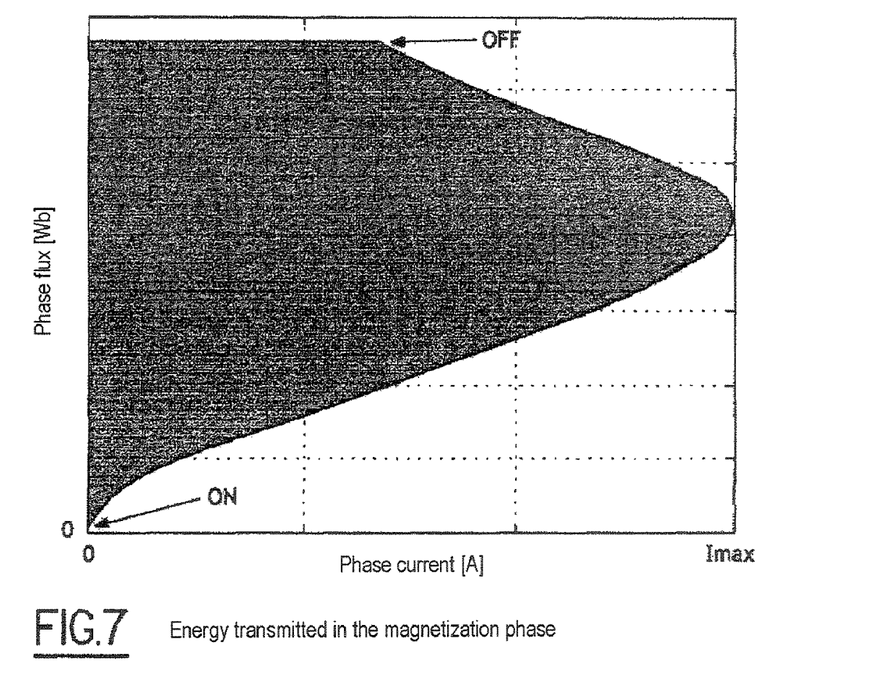
FIGS. 7 and 8 respectively represent the energy transmitted in the magnetization phase and in the demagnetization phase.

During a first phase, the energy exchanged in the magnetization phase $Emag = \int_{OFF}^{ON} I_{phase} d\phi$, as represented by the surface area of FIG. 7, is calculated.

Figure 8:
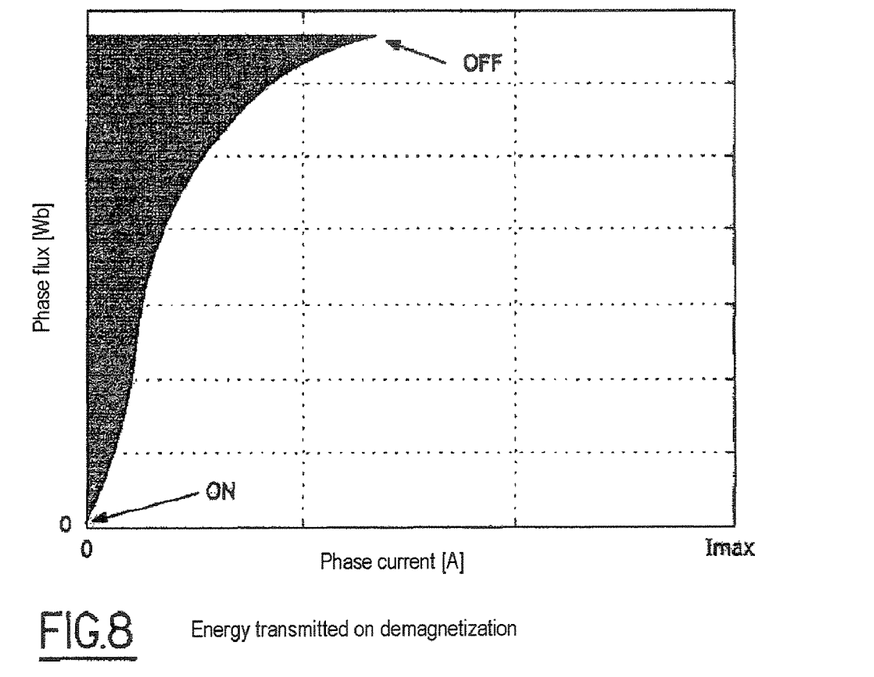

During a second phase, the energy exchanged in the demagnetization phase $Edemag = \int_{OFF}^{ON} I_{phase} d\phi$, as represented by the surface area of FIG. 8, is calculated.

The converted energy corresponds to the difference of the two surface areas represented in FIGS. 7 and 8, or even to the algebraic sum of the values Emag and Edemag (these being of opposite signs).

Figure 9:
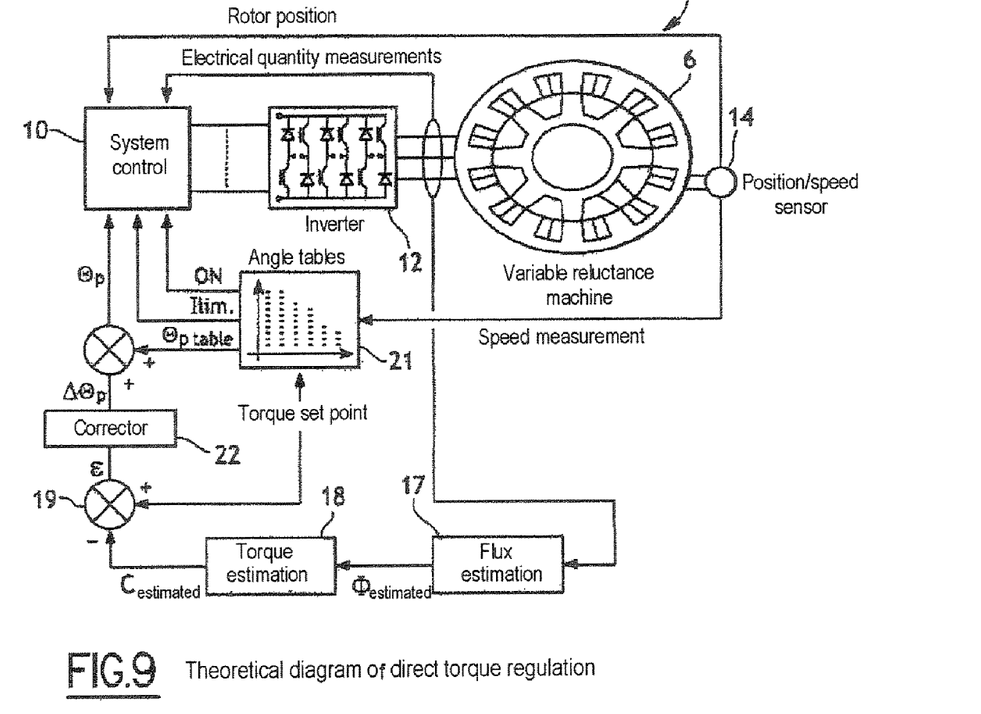
FIG. 9 represents one possible embodiment of the drive system according to the invention.

FIG. 9 represents one possible embodiment of an assembly 20 according to the invention implementing a regulation aiming to compensate for the effect of the dispersions, in particular the mechanical dispersions (as discussed in relation to a variation of the air gap in light of FIG. 5), magnetic dispersions or electrical dispersions.

In this FIG. 9, the elements of the same type as those of FIG. 1 have the same numerical references.

Starting from the conventional regulation arrangement of FIG. 1, the assembly 20 of FIG. 9 according to one possible embodiment of the invention comprises means 17 of estimating the flux followed by means 18 of estimating the torque The torque $C_{estimated}$ estimated using the means 18 is compared using a comparator 19 to the set point torque $C_{setpoint}$ which is also supplied to the angle table 21. At the output of the comparator 19, there is a measurement of the difference between the estimated torque $C_{estimated}$ and the set point torque $C_{setpoint}$ in the form of an error $\epsilon$.

The error $\epsilon$ is processed by a corrector 22 provided with a law (proportional-integral for example) suitable for determining an additional conduction angle $\Delta\Theta p$ making it possible to regulate the conduction angle set point value $\Theta p$ applied to the alternator so that the error $\epsilon$ is rendered zero (that is, so that the estimated torque is then equal to the set point torque).

The conduction angle set point value $\Theta p$ is thus equal to the sum of the set point value $\Theta p_{table}$ obtained from the angle tables and said additional conduction angle $\Delta\Theta p$: $\Theta p = \Theta p_{table} + \Delta\Theta p$.

According to the diagram of FIG. 9, the conduction angle $\Theta p$ is controlled so as to enable the torque of the machine to be controlled directly.

The torque differences due to the various dispersions are thus compensated; for one and the same operating point, the conduction angle Θp applied to the alternator will thus be different between two machines of the same type.

The torque estimation requires an electrical period. Thus, the torque required is established (and the dispersions are then compensated) only after several electrical periods. In the context of the control discussed previously in light of FIG. 9, in the first electrical period, or after a change of set point torque, a conduction angle set point value Θp equal to the angle $Θp_{table}$ supplied by the angle table 21 is applied (that is, the error ε is set to zero).

The additional conduction angle ΔΘp is then calculated and, if necessary, modifies the conduction angle applied to the machine during the second period (or even during the period following the one in which the change of set point torque occurred).

This procedure is repeated as long as the set point torque does not vary significantly, in particular regarding the resolution of the angle table.

During an electrical period, several tasks must therefore be sequenced.

The magnetization start instant ON (i.e. the ON angle) remains unchanged. During the magnetization period, the set point giving the conduction angle value Θp (having to be applied until the magnetization end instant OFF) is calculated.

Figure 10:
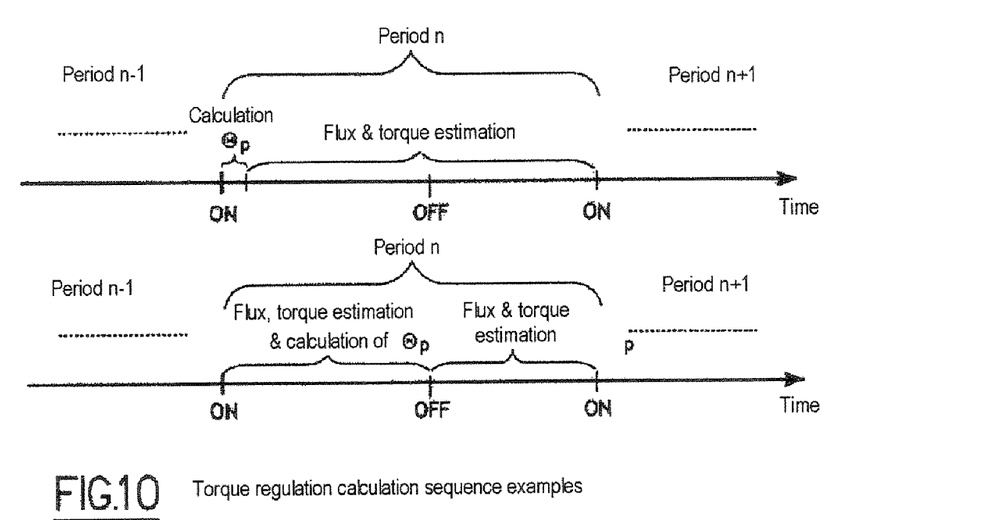
FIG. 10 gives sequencing examples of the torque regulation calculation.

According to a first option, the calculation of the control Θp can be carried out in parallel with the estimation of the torque (and therefore of the flux) during the start of magnetization. The bottom timing diagram of FIG. 10 illustrates this first option.

According to a second option, the start of the magnetization period can be devoted to calculating the control Θp, the torque estimation commencing thereafter. A linear extrapolation is then done over this period so as to estimate the torque and the flux. The top timing diagram of FIG. 10 illustrates this option.

Figure 11:
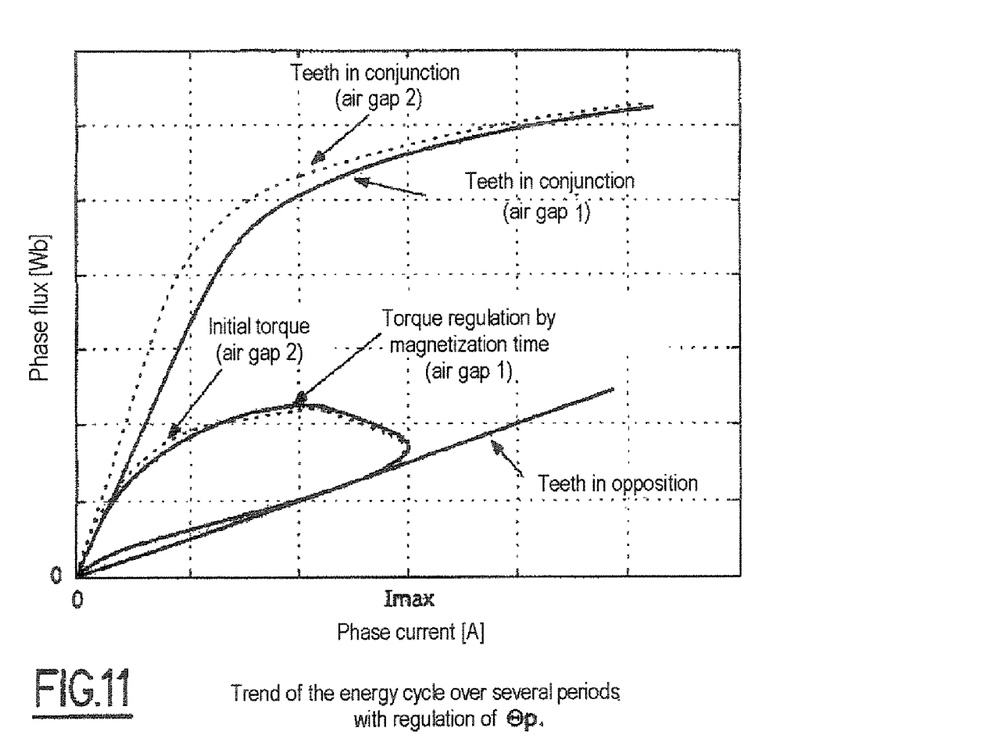
FIG. 11 represents the trend of the energy cycle over several electrical periods when the conduction angle set point value is regulated as is proposed in the context of the invention.

FIG. 11 represents one example of the effect of the regulation of the torque in discontinuous mode. Considering a machine (provided with an air gap 1), the torque of which is less than (surface area of the bottom energy cycle), given equal control, a reference machine (that provided with the air gap 2) as illustrated in FIG. 5.

Regulating the set point value of the conduction angle Θp makes it possible to compensate for the dispersions (here, the thickness of the air gap) by obtaining the output reference torque. The conduction angle increases over several periods until the energy cycle has a surface area that is equivalent (i.e., an identical torque) to that of the alternator provided with the initial air gap 2. It should be noted that the energy cycles are not equivalent; only their surface area (and therefore the torque) is identical.

In the context of the invention, the conduction angle Θp is regulated as indicated previously both in discontinuous mode and in continuous current mode.

In discontinuous mode, such a control makes it possible to compensate for the dispersions between machines of the same type.

In continuous current mode, such a control makes it possible to stabilize the torque delivered. This is of particular interest in as much as the continuous current mode, where it provides for a torque gain at high speed, is normally unstable.

In the context of the invention, the switch from the discontinuous mode to the continuous current mode is therefore done naturally, the torque being permanently regulated with the same control law.

Moreover, the various dispersions are permanently compensated for (whether in continuous or discontinuous mode). Thus, when the table gives a conduction angle $Θp_{table}$ of 180°, two machines from the same lot can be, for one and the same output torque, and according to the dispersions, one in continuous current mode and the other in discontinuous mode.

It should be mentioned here that the angle table can be addressed over the entire torque range (discontinuous and continuous modes). In the area (high speed and high torque) that can be reached with the continuous current mode, the table supplies a set point $Θp_{table}$=180°; the control law of the torque then regulating the conduction angle Θp applied to the alternator so as to stabilize the continuous current mode on the one hand, and to supply the set point torque on the other hand.

The invention claimed is:

1. A control method for a vehicle drive assembly, comprising:
applying a conduction angle set point value to a variable reluctance machine;
regulating the conduction angle set point value by comparing a table set point torque from an angle table and a torque estimation value to determine a control measurement of torque delivered by the drive assembly, and the control measurement of torque determined by the comparing is corrected to determine an additional conduction angle which is added to a set point angle from the angle table to determine the regulated conduction angle set point value; and applying the regulated conduction angle set point value to the variable reluctance
machine to compensate for dispersions of the variable reluctance machine.

2. The method as claimed in claim 1, wherein the control measurement of torque is corrected by a corrector provided with a correction law suitable for determining the additional conduction angle intended to be applied to the machine to regulate the conduction angle set point value and render a difference between the table set point torque and the torque estimation value as zero.

3. The method as claimed in claim 1, wherein the torque control measurement is carried out using an estimation of phase flux.

4. The method as claimed in claim 3, wherein the phase flux is estimated by integrating a voltage applied to a phase in an electrical period according to $Φestimated=∫(U_{phase}-R_{phase}·I_{phase})dt$, where $R_{phase}$ designates resistance of a stator winding, $U_{phase}$ phase voltage, and $I_{phase}$ phase current.

5. The method as claimed in claim 4, wherein a direct measurement of the phase voltage is carried out.

6. The method as claimed in claim 4, wherein a start and end of magnetization control instructions and phase current are used to determine the phase voltage, the phase voltage being equal to a power supply voltage $V_{DC}$ during a magnetization time, to $-V_{DC}$ during a demagnetization time, and to zero during free-wheeling phases or when the phase current is zero.

7. The method as claimed in claim 3, wherein the phase flux estimation is periodically updated using a measured flux value.

8. The method as claimed in claim 7, wherein the phase flux estimation is realigned, in each electrical period, at a time of transition to opposition, on value $L_0·I_{phase}$, where $L_0$ is inductance in opposition and $I_{phase}$ is current measured at an instant of the transition to opposition.

9. The method as claimed in claim 3, wherein the torque is estimated, using the flux estimation, by calculating a difference between energy transmitted in a magnetization phase and energy returned in a demagnetization phase.

10. The method as claimed in claim 2, wherein the correction law is of proportional-integral type.

11. The method as claimed in claim 3, wherein, over an electrical period, the conduction angle set point value calculated from the phase flux estimation calculated in a preceding electrical period is applied to the machine.

12. The method as claimed in claim 11, wherein the conduction angle set point value in a first period is fixed at a predetermined value, the predetermined value being the set point angle supplied by the angle table addressed by the table set point torque.

13. The control method as claimed in claim 1, wherein the machine operates in a discontinuous mode or in a continuous current mode, the set point angle supplied by the angle table being equal to 180° when operating in the continuous current mode.

14. A drive assembly for motor vehicle, comprising:
an internal combustion engine;
a variable reluctance machine; and
a control unit configured apply to the machine a conduction angle set point value, and configured to regulate the conduction angle set point value by comparing a table set point torque from an angle table and a torque estimation value to determine a control measurement of torque delivered by the drive assembly, wherein the control unit includes a corrector to correct the control measurement determined by the comparing to determine an additional conduction angle which is added to a set point angle from the angle table to determine the regulated conduction angle set point value, and the regulated conduction angle set point value is applied to the variable reluctance machine to compensate for dispersions of the variable reluctance machine.

15. The assembly as claimed in claim 14, further comprising means for calculating an estimation of a phase flux,
wherein the control unit calculates the torque estimation based on the phase flux estimation.

16. A vehicle, comprising:
an assembly as claimed in claim 14.

17. The control method as claimed in claim 1, wherein the table set point torque from the angle table is determined based on a signal from a position/speed sensor.

18. The control method as claimed in claim 1, wherein the angle table provides start of magnetization angles and peak phase current angles.

19. The assembly as claimed in claim 14, wherein the table set point torque from the angle table is determined based on a signal from a position/speed sensor.

20. The assembly as claimed in claim 14, wherein the angle table provides start of magnetization angles and peak phase current angles.

* * * * *